United States Patent
Knubben

(10) Patent No.: US 9,616,402 B2
(45) Date of Patent: Apr. 11, 2017

(54) CATALYST LOADING TOOL

(71) Applicant: Mourik International B.V., Botlek-Rotterdam (NL)

(72) Inventor: Petrus Paulus Gerardus Marie Knubben, Leiden (NL)

(73) Assignee: MOURIK INTERNATIONAL B.V., Botlek-Rotterdam (NL)

( * ) Notice: Subject to any disclaimer, the term of this patent is extended or adjusted under 35 U.S.C. 154(b) by 219 days.

(21) Appl. No.: 14/396,108

(22) PCT Filed: Apr. 23, 2013

(86) PCT No.: PCT/EP2013/058406
§ 371 (c)(1),
(2) Date: Oct. 22, 2014

(87) PCT Pub. No.: WO2013/160311
PCT Pub. Date: Oct. 31, 2013

(65) Prior Publication Data
US 2015/0107717 A1   Apr. 23, 2015

Related U.S. Application Data

(60) Provisional application No. 61/638,610, filed on Apr. 26, 2012.

(30) Foreign Application Priority Data

Apr. 23, 2012  (NL) ..................................... 2008687

(51) Int. Cl.
*B01J 8/06* (2006.01)
*B01J 8/00* (2006.01)

(52) U.S. Cl.
CPC ................. *B01J 8/003* (2013.01); *B01J 8/06* (2013.01); *B01J 2208/00752* (2013.01)

(58) Field of Classification Search
CPC ..... B01J 8/003; B01J 8/06; B01J 2208/00752
(Continued)

(56) References Cited

U.S. PATENT DOCUMENTS

| 2,985,341 A | 5/1961 | Howell |
| 3,223,490 A | 12/1965 | Sacken et al. |

(Continued)

FOREIGN PATENT DOCUMENTS

| CN | 101378828 A | 3/2009 |
| DE | 19934324 A1 | 9/2000 |

(Continued)

OTHER PUBLICATIONS

International Search Report of PCT/EP2013/058406 issued on Oct. 29, 2013.

*Primary Examiner* — Nicolas A Arnett
(74) *Attorney, Agent, or Firm* — Ramin Amirsehhi; David P. Owen; Hoyng Rokh Monegier LLP

(57) ABSTRACT

There is provided a loading tray for loading particulate material into a catalytic reactor comprising an upper tubesheet and an array of reaction tubes extending downward from the tubesheet; wherein the loading tray comprises: a loading template comprising one or more loading openings; one or more supports for spacing the loading template above the tube-sheet to form a volume between the loading template and the upper tube-sheet; and a vacuum outlet for application of suction to the volume between the loading template and the upper tubesheet.

17 Claims, 7 Drawing Sheets

(58) Field of Classification Search
USPC .................. 141/8, 11–12, 65, 69, 71, 98
See application file for complete search history.

(56) References Cited

U.S. PATENT DOCUMENTS

| | | | |
|---|---|---|---|
| 3,409,411 A | 11/1968 | Mosley et al. | |
| 3,617,227 A * | 11/1971 | Beggs | C01B 3/384 252/373 |
| 3,913,806 A | 10/1975 | Red, Jr. | |
| 4,077,530 A | 3/1978 | Fukusen et al. | |
| 4,402,643 A | 9/1983 | Lytton et al. | |
| 4,433,707 A | 2/1984 | Farnham | |
| 4,737,269 A | 4/1988 | Bischoff | |
| 5,114,685 A | 5/1992 | Sapoff et al. | |
| 5,607,893 A | 3/1997 | Diekmann | |
| 5,890,868 A * | 4/1999 | Comardo | B01J 8/002 414/160 |
| 5,897,282 A * | 4/1999 | Comardo | B01J 8/002 141/232 |
| 5,906,229 A | 5/1999 | Haquet et al. | |
| 6,409,977 B2 | 6/2002 | Harper et al. | |
| 6,880,591 B2 * | 4/2005 | Goemans | B01J 8/003 141/237 |
| 6,905,660 B2 * | 6/2005 | Harper | B01J 8/003 141/236 |
| 7,121,309 B2 * | 10/2006 | Goemans | B01J 8/002 141/237 |
| 7,285,251 B2 * | 10/2007 | Johns | B01J 8/003 141/286 |
| 7,458,401 B2 * | 12/2008 | Johns | B01J 8/003 141/2 |
| 7,836,919 B2 * | 11/2010 | Johns | B01J 8/003 141/1 |
| 2001/0046463 A1 | 11/2001 | Harper et al. | |
| 2004/0191135 A1 | 9/2004 | Johns et al. | |
| 2004/0261898 A1 | 12/2004 | Goemans et al. | |
| 2006/0233631 A1 | 10/2006 | Diehl et al. | |
| 2007/0196253 A1 | 8/2007 | Stocksiefen et al. | |
| 2009/0308138 A1 | 12/2009 | Fischer et al. | |
| 2010/0063304 A1 | 3/2010 | Olbert et al. | |
| 2011/0083769 A1 | 4/2011 | Sanz et al. | |
| 2015/0114516 A1 * | 4/2015 | Knubben | B01J 8/06 141/12 |

FOREIGN PATENT DOCUMENTS

| | | |
|---|---|---|
| EP | 0963785 A1 | 12/1999 |
| EP | 2314371 A1 | 4/2011 |
| GB | 1335034 A | 10/1973 |
| GB | 1417464 A | 12/1975 |
| GB | 2186209 A | 8/1987 |
| NL | 7207472 A | 12/1973 |
| WO | 98/14392 A1 | 4/1998 |
| WO | 2004/085051 A | 10/2004 |
| WO | 2006/104832 A2 | 10/2006 |
| WO | 2007/041254 A2 | 4/2007 |
| WO | 2010/068094 A2 | 6/2010 |

* cited by examiner

CATALYST LOADING TOOL

BACKGROUND OF THE INVENTION

1. Field of the Invention

The invention relates generally to a catalyst loading tool for loading particulate catalyst material into a catalytic reactor; a filler sleeve; and a method of loading particulate catalyst into a catalytic reactor using the catalyst loading tool. In particular the invention relates to a device and method of loading catalyst pellets into catalytic reactor vessels having a plurality of vertically aligned, parallel reaction tubes.

2. Description of the Related Art

Chemicals are often manufactured on an industrial scale by reaction in large industrial catalytic reactors. A type of industrial catalytic reactor often used is provided with a multitude of vertically arranged, parallel reaction tubes partially or fully filled with catalyst particles or pellets during operation. Chemical reactants are passed through the reaction tubes to contact the catalyst for reaction. Such reactors are often referred to as multi-tube reactors. These types of reactors are known and are described in patent publications GB3,223,490 and U.S. Pat. No. 6,409,977.

Typical catalytic reactors are cylindrical with a diameter in the region of 2 to 9 meters and a height in the region of 5 to 50 meters. In principle, such a reactor can be of any size, and in particular can be bigger or smaller than the typical sizes given above, the limitations being associated with physical construction limits and reaction requirements. There has been a general trend in the last years, particularly in the petrochemical industry, to increase catalytic reactor sizes.

The reactor is normally provided with a cylindrical shell containing a large number of vertically aligned, parallel reaction tubes; anywhere from 500 to 40,000. The reaction tubes have upper and lower ends that are joined e.g. welded, to openings in upper and lower tube sheets. The tube sheets extend horizontally in the cylindrical shell and are normally located adjacent end flanges thereof. The upper and lower ends of the reactor shell are closed off by domes that can be opened to permit internal access for servicing and catalyst replacement in the reaction tubes. For example, the domes may be provided with manholes to allow worker access or may be removable. Oftentimes domes are non-removable, or not conveniently removable, because cooling pipes are run through the dome into the reactor core. These cooling pipes can make it complicated or impossible to remove the dome of the reactor.

The reaction tubes are open at their ends and can have inner diameters from in the region of about 2 to 15 cm. They are joined (e.g. by welding) to a pattern of openings provided in the tube sheets. The number of tubes and pattern of openings in the tube sheets is appropriate to the chemical reaction and scale of reaction that is carried out in the reactor, but normally the openings are equally spaced with a, preferably constant, pitch (i.e. the shortest distance between the outer periphery of one hole and the outer periphery of its neighbour hole) of from 0.3 to 5 cm or more.

Catalyst particles are loaded into the reaction tubes. Catalyst particles are provided in a variety of sizes and shapes, typically spherical or cylindrical and having nominal diameters in the range of from about 1 mm to 25 mm, more normally in the range of 2 to 15 mm. The reaction tubes and catalyst pellets are matched in size to allow for the particles to enter the reaction tubes in a controlled manner that minimizes the risk of bridging. Typically the particles have a maximum dimension from 0.1 to 0.8 times the reaction tube inner diameter, more normally from 0.15 to 0.6, and more normally 0.25 to 0.4.

Careful loading of the catalyst particles into the reaction tubes is essential to ensure that the catalyst reaction proceeds as desired. In particular, it is necessary to: achieve the correct loading density of particles within a reaction tube; to make sure that each of the reaction tubes has a similar pack density within a tolerance range; to avoid bridging, i.e. void formation when two or more particles wedge against one another in the tube forming a false base; to provide filling of the catalyst to the correct level in the reaction tube i.e. allowing sufficient tube outage when needed; to avoid as far as possible dust entry into the reaction tubes; and to avoid crushing and/or attrition of catalyst particles by harsh filling practices. When loading catalyst into the reactor tubes it is best to limit the loading orifice so that catalyst particles enter one by one, predominantly because this reduces the risk of bridging.

A conventionally used loading method is template loading. In such a method a large custom template is provided. The template forms a grid of holes with spacing that matches the layout of the reactor tube ends in the tubesheet. The template is laid over the tubesheet of the reactor. Catalyst is poured onto the template and is loaded into the reactor tube ends by up to four persons sweeping the catalyst over the template.

A problem with conventional loading processes is found in release and generation of catalyst dust and fines. Although catalyst material is typically sieved to remove dust at the point of manufacture or dispatch, not all dust can be removed and new dust and fines is unavoidably generated due to particle attrition during transport and loading.

Dust and fines are a problem because they can pollute the working environment for personnel; they can adversely affect the catalytic reaction in the vessel by increasing density of packing and by blocking reactant flow; and they can pollute reaction product.

Attempts have been made in the prior art to reduce the problem of dust and fines.

In WO2006/104832, US2006/0233631 and U.S. Pat. No. 4,077,530 for example, insertion of velocity reducing devices to the reaction tubes has been proposed so as to slow particles as they fall in the tubes.

U.S. Pat. No. 4,737,269 discusses a catalyst loading hopper provided with a dust outlet at the top of the hopper, which may be connected to a conduit so as to draw dust away from the upper end of the hopper and a screen at the bottom of the hopper to separate the catalyst from any fine or undersized catalyst particles. This apparatus can capture some of the dust generated due to attrition during transportation but improvement is desirable. In addition the apparatus does not address the matter of dust generated during loading of catalyst particles into the reaction tubes, by e.g. sweeping or vibration of the particles.

U.S. Pat. No. 3,409,411 discusses a method of separating fines from particulate catalyst during loading, by application of a vacuum. The catalytic reactor addressed is a flat-bed reactor that is loaded with a single hose, not with a catalyst loading template.

There remains a need for improved filling practices and filling apparatuses.

THE INVENTION

According to the present invention there is provided a loading tray for loading particulate material into a catalytic reactor comprising an upper tubesheet and an array of reaction tubes extending downward from the tubesheet; wherein the loading tray comprises:
a loading template comprising one or a plurality of loading openings;
one or more supports for spacing the loading template above the tubesheet to form a volume between the loading template and the upper tubesheet; and
a vacuum outlet for application of a vacuum to the volume between the loading template and the upper tubesheet when the loading template is in place for use.

Application of a vacuum to the volume immediately prior to the catalyst particles entering the reaction tubes removes dust and fines present in the catalyst material at the final stage of filling, thus reducing the amount of further dust and fines that can be created downstream of a dust removal step.

The volume between the tubesheet and catalyst loading template is substantially closed in order to achieve a good airflow over and through the stream of catalyst particles as they pass through the volume when falling into the reaction tubes.

Preferably the volume between the tubesheet and catalyst loading template is elongate, or divided into elongate chambers, each chamber being provided with a vacuum outlet. Even more preferably the catalyst loading holes are in linear configuration along the length of the volume, or chambers. Most preferably the catalyst loading openings are disposed in a single row. This configuration allows for a well controlled airflow when a vacuum outlet is provided at a short end thereof. Catalyst loading trays that could be suitable for provision of division into chambers in the internal volume could be, square, rectangular and triangular loading trays with square, rectangular or triangular blocks of catalyst loading holes.

It is also noted that configurations of catalyst loading holes other than linear might be necessary where application of the catalyst loading tray to a more unconventional layout is desired.

It is generally desirable to provide the loading templates with the maximum number of catalyst loading openings that the vacuum can support for fines removal, as well as taking into account dimension and weight practicalities. A maximum number of catalyst loading openings offers a maximum template coverage for filling as many tubes as possible with one template. A catalyst loading template provided with one vacuum outlet preferably comprises from 2 to 40 loading openings; preferably from 3 to 30 openings, and most preferably from 4 to 20 openings. For template comprising more loading openings, or assembled arrays of templates it is preferable that a vacuum outlet is provided for at least every 40, more preferably for at least every 30 and most preferably for at least every 20 loading openings. This ensures an adequate air flow under the loading openings and hence dust and fines capture. In this manner loading templates of for example 300 or more, 400 or more, or 500 or more loading openings can be applied, with multiple vacuum outlets being provided.

In a preferred embodiment of the invention a channel is provided extending between the underside of the catalyst loading openings of the template and the upper side of the reaction tube openings, the channel having side sieve openings that are sized to block passage of catalyst particles but that allow passage of dust and fines, which can be captured by the vacuum. Typical catalyst particles have nominal diameters of about 1 mm to about 25 mm. Typically dust and fines range in size from about 1 to about 100 microns. The sieve openings are preferably sized to prevent passage of a particle having at least one dimension at least about 0.2 of an upper, inner diameter of the channel. The sieve openings can be in the form of slot openings, circular openings forming a grid of openings to allow airflow, or could be openings in a gauze or wire mesh.

The vacuum sieving can beneficially be combined with use of a filler sleeve, the filler sleeve comprising:
an upper portion having a catalyst loading orifice and an loading template engagement member;
a tubular sleeve extending downwardly from said upper portion so that the catalyst loading orifice leads to an interior of the tubular sleeve; wherein
the tubular sleeve is provide with side sieve openings sized to prevent passage of particulate catalyst but to allow passage of dust. In this way the filler sleeve forms the sieve channel between the catalyst loading hole and the reaction tube opening.

It is preferred that the sieve openings are disposed to be at least partially located within the upper ¼ of the length of the tubular sleeve, preferably the upper ⅛.

Catalyst filler sleeves are known and offer a simple manner to achieve a desired outage in the reaction tubes by creating a temporarily restricted volume in the upper part of the reaction tubes during filling. Such tubes are known from, e.g. WO2004/085051.

A filler sleeve comprises an upper portion having a loading orifice and a support engagement member, and a tubular sleeve extending downwardly from the upper portion so that the loading orifice leads to an interior of the tubular sleeve. The template engagement member is preferably a flange. The flange engages the periphery of a loading opening and rests thereon. Preferably a seat is provided at the edge of the loading opening on which the upper flange comes to rest. Most preferably the seat has a depth that matches the thickness of the upper flange so that when seated the upper flange is flush with the particle receiving surface of the template. This provides a flat particle receiving surface for the template and helps to avoid riding up of the filler sleeve which could interfere with filling processes.

The loading orifice has a size dependent upon the size and shape of the catalyst to be used. The loading orifice of the filler sleeve allows particles to enter and therefore preferably has a diameter at least 1.1 times the greatest dimension of the particle to be loaded, preferably 1.2 times. The loading orifice size is preferably limited to restrict the passage of particles to one or two particles at a time. When allowing only one by one entry of particles preferably the orifice diameter is less than 2 times the greatest dimension of the particle to be loaded. When allowing two particles at a time only the diameter is preferably less than 3 times the greatest dimension of the particle. This helps to avoid bridging.

It is preferred that the filler sleeves are vertically supported within the loading openings of the constructed loading tray because they can then be vertically removed from the reaction tubes together with the loading template when this is raised. Advantageously this allows a single removal step of both loading template and filler sleeve avoiding the time consuming need to remove each filler sleeve individually It is preferred that the filler sleeves are removable from the catalyst loading openings of the template since this allows for various outages to be obtained, however filler sleeves could conceivably be permanently fixed in position.

An alternative to filler tubes, where such are not required for obtaining outage in the reaction tubes, are short sieve tubes that form a channel limited to between the catalyst loading openings and the reaction tube openings, the sieve tubes having sieve openings as discussed above in their sidewall(s).

The sieve openings are most effective for dust removal when they are at least partially located within the volume between the loading template and the upper tubesheet, since this is where the vacuum is strongest. Preferably the sieve holes are only present within that volume. The sieve openings are also preferably simple apertures and are not provided with valves, closings or such.

In a preferred embodiment an air-flow deflector may be provided in front of the vacuum outlet to reduce suction applied to the channel(s) closest to the vacuum outlet while ensuring adequate air flow at channels further removed from the vacuum outlet. In one realisation the deflector may be a semi-circular wall with its concave side facing the channel or filler sleeve closest the vacuum outlet.

The filler sleeves and loading template can be formed from a variety of materials which the skilled person will be able to select based on the particular application of the filling tool. In the case of catalyst loading, it is important that the material of the loading tray is inert with respect to the catalyst in order to avoid chemical attack of the loading tray or chemical changes to the catalyst. Preferred construction materials are stainless steel and aluminium but alternative include, for example, polypropylene and polyvinyl chloride plastics.

To aid in loading the catalyst particles into the catalyst loading openings, and to also preferably overcome the need for manual sweeping, at least a part of the loading template is subjected to vibration to agitate the catalyst particles so that they load into the openings. When this is the case the support holding the catalyst loading template may beneficially comprise a resilient or flexible material to isolate the other components of the loading tray and the catalytic reactor from the vibration.

In a preferred form the catalyst loading tray is provided with one or more upstanding sidewalls at or beyond at least a part of the periphery of its array of catalyst loading openings. This wall acts to form a tray in which the catalyst particles can be poured prior to loading through the catalyst loading holes. The upstanding walls are preferably releasably attached by a mechanical fastening mechanism.

In a further aspect the invention relates to a method of loading particulate catalyst into a catalytic reactor comprising an upper tubesheet and an array of reaction tubes extending downward from the tubesheet; comprising the steps of:
a. disposing a catalyst loading tray as discussed, above the reaction tubes of the catalytic reactor so that the catalyst loading openings align with openings of the reaction tubes;
b. supplying the particulate catalyst material to the array of the catalyst loading openings such that the particulate catalyst material passes through the catalyst loading openings and the reactor tube openings;
c. applying a vacuum via the vacuum outlet for at least part of the duration of step b, preferably for the substantial duration of step b, and more preferably also prior to and/or subsequent to step b; and
d. removing the catalyst loading tray from the catalytic reactor.

Preferably the method involves vibrating the template during at least part of step b; and more preferably also during at least a art of step d.

More preferably the method also involves the step of inserting filler sleeves into at least some of the loading openings prior to the filling step, and even more preferably of removing the inserted filler sleeves from the loading openings after filling.

In still a further aspect of the invention there is provided a kit of parts comprising: at least one catalyst loading tray as discussed; and a plurality of catalyst filler tubes as discussed.

BRIEF DESCRIPTION OF THE DRAWINGS

The features and advantages of the invention will be further appreciated upon reference to the following drawings, presented by way of example only, in which.

DESCRIPTION OF ILLUSTRATIVE EMBODIMENTS

Figure 1:
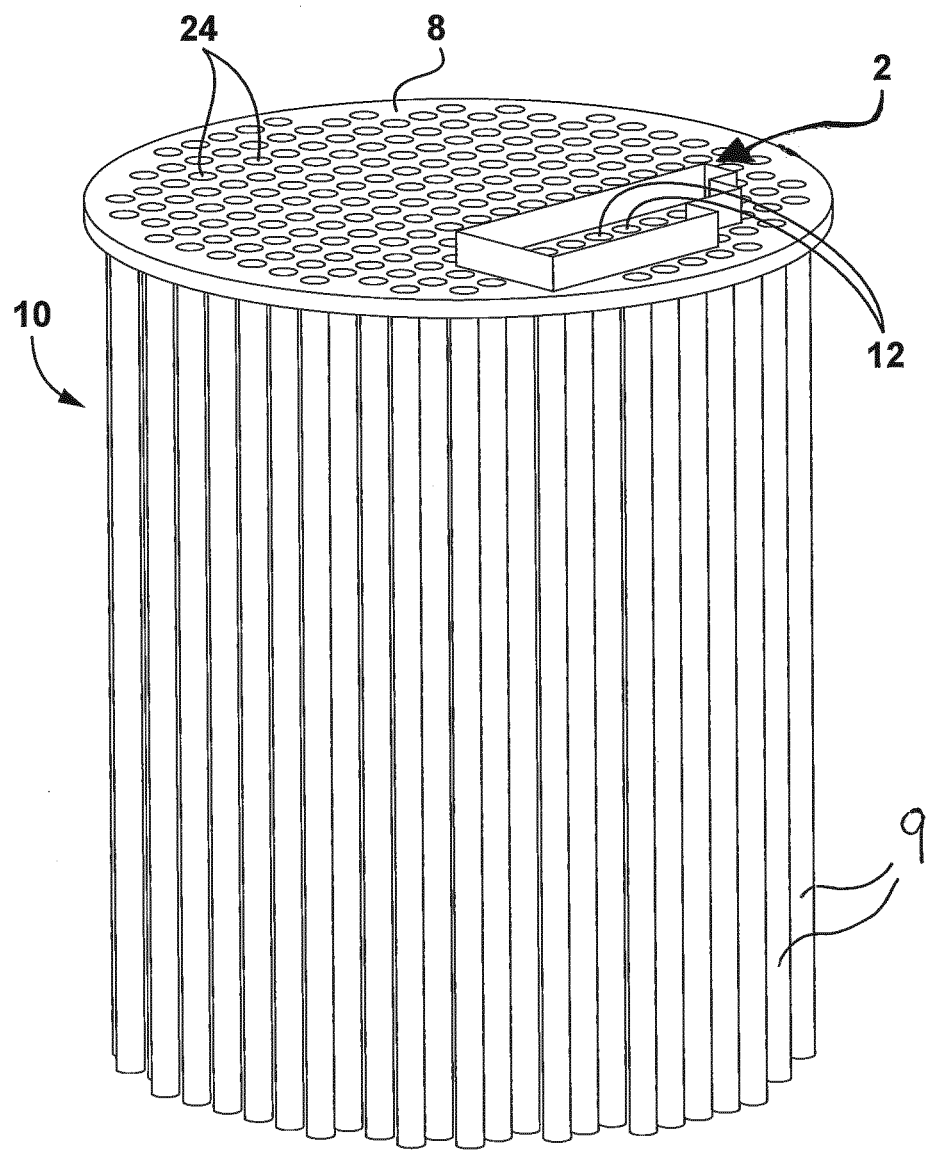
FIG. 1 is a partial perspective view of a catalytic reactor (sidewall not shown) having a catalyst loading tray disposed on its tubesheet.

FIG. 1 shows a partial view of a catalytic reactor 10 provided with an upper tubesheet 8 having an array of reaction tube openings 24. Each reaction tube openings leads to a reaction tube 9 extending downwardly from the tubesheet within the catalytic reactor 10. The catalytic reactor 10 is normally provided with an enclosing sidewall and a lower tubesheet to form an enclosed space for, for example, coolant. For ease of explanation the sidewall and lower tubesheet are not shown in the figures.

A catalyst loading tray 2 is provided on top of the tubesheet 8 to aid insertion of particulate catalyst material via the reaction tube openings 24 into the reaction tubes 9. The catalyst loading tray 2 forms a trough into which particulate catalyst can be poured from, for example, a hopper. The loading tray 2 itself is provided with an array of catalyst loading openings 12 which are aligned with the reaction tube openings 24 of the tubesheet 8. In use catalyst particles pass via the catalyst loading openings 12 through to the reaction tube openings 24 and are loaded into the reaction tubes 9.

Figure 2A:
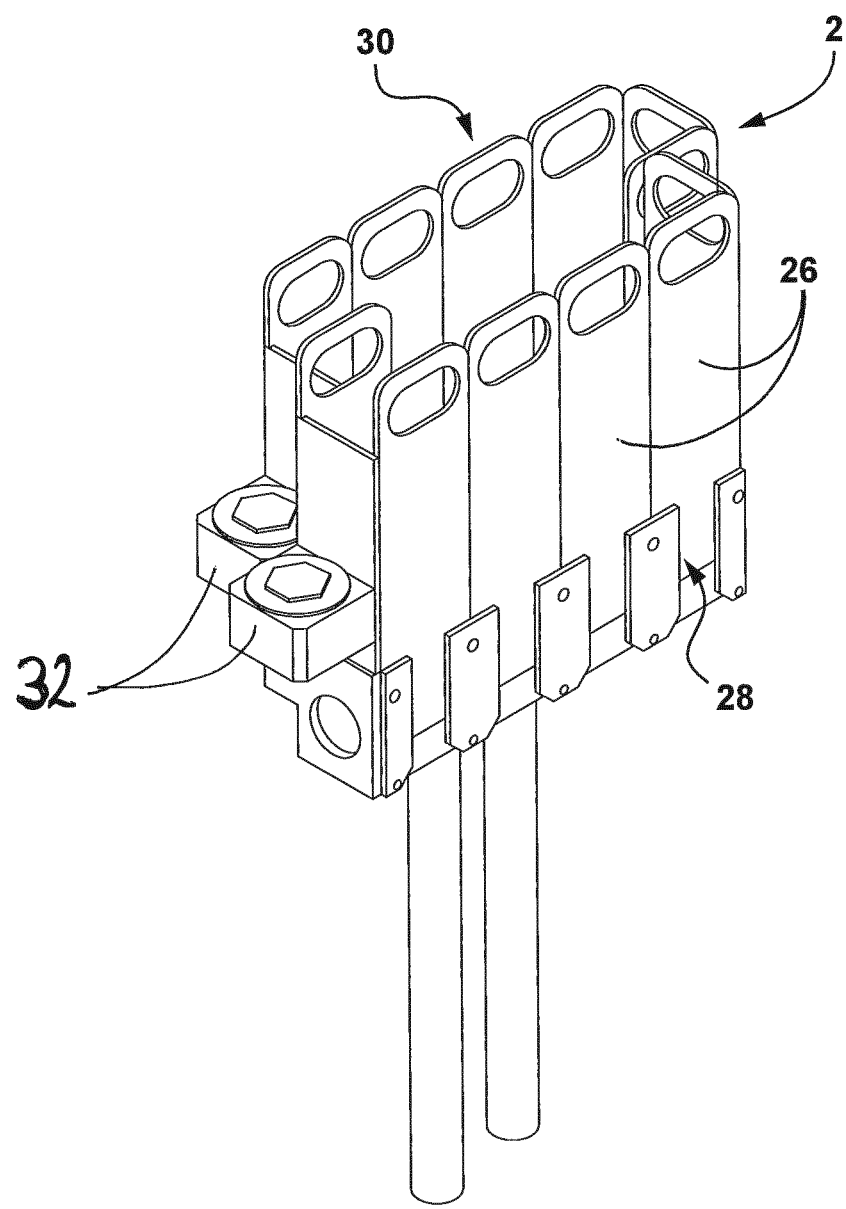
FIG. 2A is a perspective view of a catalyst loading tray provided with an upstanding peripheral wall.
Figure 3:
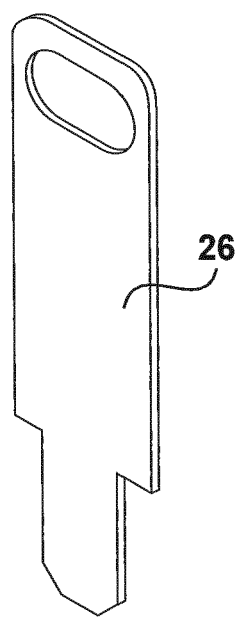
FIG. 3 is a perspective view of a peripheral wall element.

FIG. 2A shows a more detailed perspective view of a catalyst loading tray 2. The catalyst loading tray 2 is provided with removable, upstanding sidewall elements 26. These sidewall elements 26 form an upstanding peripheral sidewall 30 of the trough into which particulate catalyst can be poured. The sidewall elements 26 are removably fitted to the catalyst loading tray 2 by vertical insertion into T-slots 28. A clearer view of a removed sidewall element 26 is found in FIG. 3. The illustrated sidewall element 26 is appropriate to fit a single T-slot 28 only, and the upstanding peripheral sidewall 30 of FIG. 2A is made up of twelve such elements adjacent one another. In some circumstances it may be advantageous to provide sidewall elements 26 that fit more than one T-slot 28 at a time, so that at least one side of an upstanding peripheral sidewall 30 can be formed of a single element. For example the four sidewall elements 26 of the closest side of the loading tray in FIG. 2A could be replaced by a single element 26 fitting into the four slots 28.

Figure 2B:
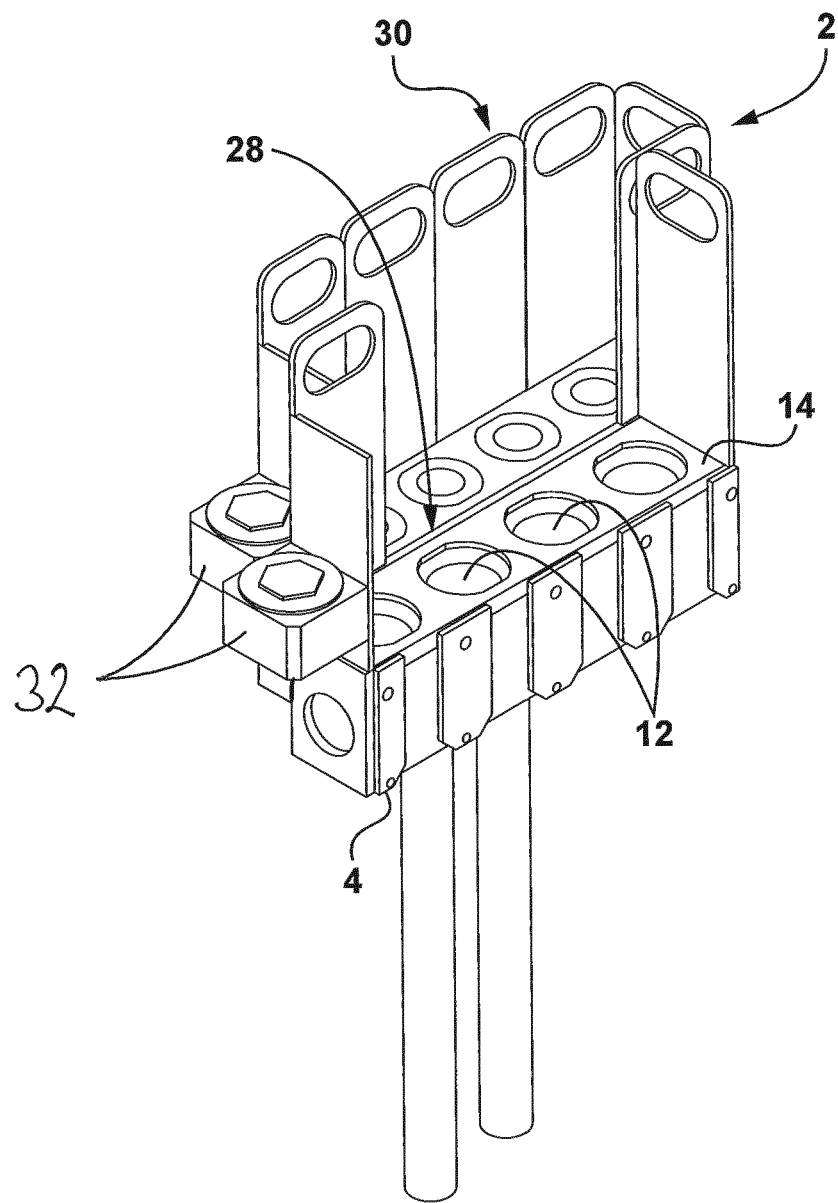
FIG. 2B is a perspective view of the catalyst loading tray of FIG. 2A with a part of the peripheral wall removed.

FIG. 2B shows the catalyst loading tray 2 of FIG. 2A with the closest side of the sidewall 30 removed to reveal a catalyst loading template 14 comprising an array of catalyst loading openings 12.

As can be seen, the catalyst loading tray 2 is constructed from two elongate catalyst loading tray elements 4 joined to one another along one of their long sides. Each of the shown loading elements is provided with four loading openings 12. By joining the two loading tray elements 4 together an extended planar array of eight loading openings 12 is formed allowing particulate catalyst to be loaded into more reactor tubes at once. Naturally, loading tray elements containing more than four or less than four loading openings can be provided.

The loading tray elements 4 are releasably joined together by a T-slot mechanism 28 that allows the elements 4 to be vertically slid into and out of engagement. It will be clear to those skilled in the art that other forms of releasable fixation of the elements can be used such as L-slots, dove-tail joins and magnetic attachments.

Although in FIGS. 2A and 2B only two catalyst loading tray elements 2 are shown slotted together, extended loading trays having arrays of many more catalyst loading openings 12 can be constructed by modular construction of a greater number of loading tray elements 4 than that shown. It is considered that constructions with arrays of from about 50, 80, 100 or more catalyst loading openings 12 are particularly practical for a speedy and efficient loading of catalyst into a catalytic reactor.

The catalyst loading tray elements 4 can also be assembled into a variety of catalyst loading tray shapes by, for example off-setting adjacent elements 4 from one another, as is shown in FIGS. 2A and 2B. In this manner different forms of catalyst loading tray 2 can be assembled to fit a variety of dimensions of catalytic reactor tubesheets, for example to match a particular tube array pattern following an inner radius of a reactor or to be fitted around cooling pipes passing through a tubesheet. Practically, this feature allows catalyst loading trays 2 to be constructed that can fit the outer radii of specific catalytic reactors, without the need for a bespoke template or manual filling of reaction tubes missed by a 'one fits all' type catalyst loader.

It is a particularly useful aspect of the loading tray 2 that it can be assembled from a kit of parts containing a variety of loading tray elements 4 of different sizes, i.e. having different numbers of loading openings 12. Since the loading openings within the loading tray elements of a particular kit will have the same pitch, elements having more loading openings 12 will be larger, and preferably longer when the loading openings 12 are laid out in a single line. By providing a variety of loading tray element sizes in a kit the possible catalyst loading tray forms that can be constructed from the elements 4 is further extended.

A kit of parts might comprise 25 or more loading tray elements having 20 loading openings, 15 or more elements having 10 loading openings, 10 or more elements having 5 loading openings, 5 or more elements having 4 loading openings, 5 or more elements having 3 loading openings, 5 or more elements having two loading openings and 5 or more elements having 1 loading opening.

Figure 4:
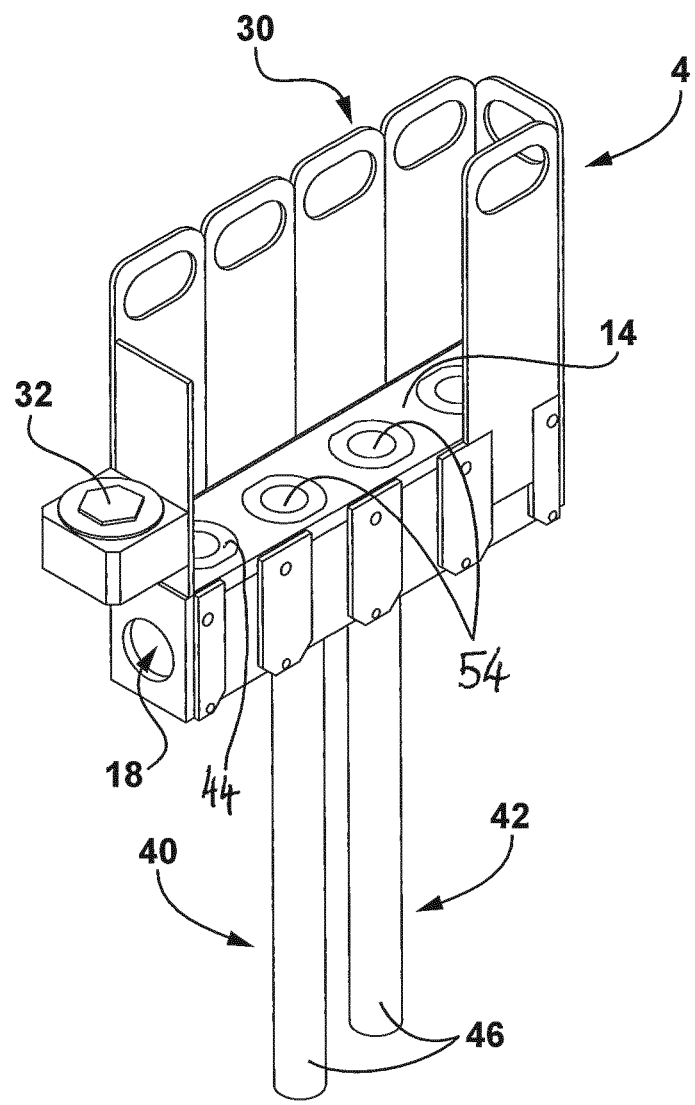
FIG. 4 is a perspective view of a single catalyst loading tray element.

As shown in FIG. 4 two filler sleeves 40 and 42 are provided. A filler sleeve is a tool for loading catalyst into a reactor tube. The loading sleeves 40, 42 have upper flanges 44 which rest in the catalyst loading openings 12 of the catalyst loading template 14 and define loading orifices 54 having a diameter smaller than the diameter of the loading openings 12. The loading sleeves 40, 42 are provided with downwardly extending sleeves 46 that penetrate into the reaction tubes of the catalytic reactor. Filler sleeves are generally known in the art of catalyst loading and are used to provide a controlled level of outage in the loaded reactor tubes. Since the volume inside a filler sleeve is less than the volume of the surrounding portion of the reactor tube 12, when it is removed after being filled it deposits a limited amount of catalyst particles into the top of the reactor tube, which limited amount then sinks to fill the larger volume of the reactor tube. The result is a controlled outage in the reaction tube.

When in use each of the catalyst loading openings 12 is provided with a filler sleeve 40, 42. In some cases one or more of the catalyst loading holes 12 may be blocked with a plug (not shown) if it is not required that catalyst be added at a particular location.

Figure 5:
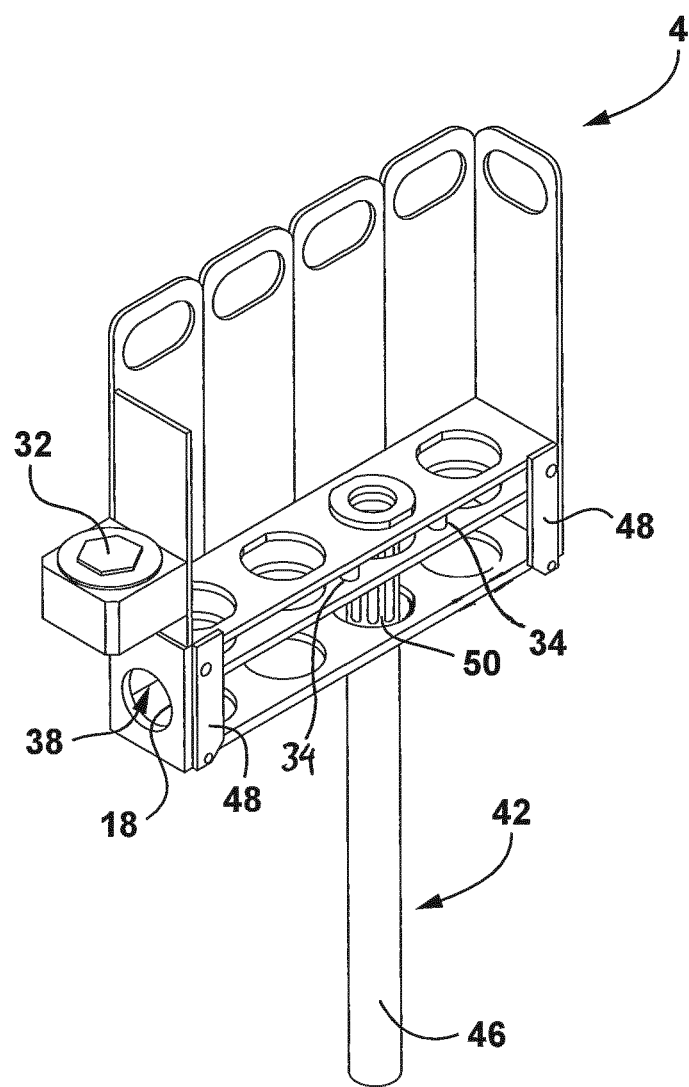
FIG. 5 is a perspective view of the catalyst loading tray element of FIG. 4 with a sidewall removed.

As can be seen in FIG. 5 the catalyst loading template 14 is held in a raised position above the tubesheet 8 by way of supports 48 to create a volume 38 between the catalyst loading template 14 and the tubesheet 2. In FIG. 4, and in use, this volume is substantially closed off except for a vacuum outlet 18 to which a pump (not shown) can be connected to apply a vacuum to the volume 38; the catalyst loading openings 12 and the reaction tube openings 8.

Figure 6:
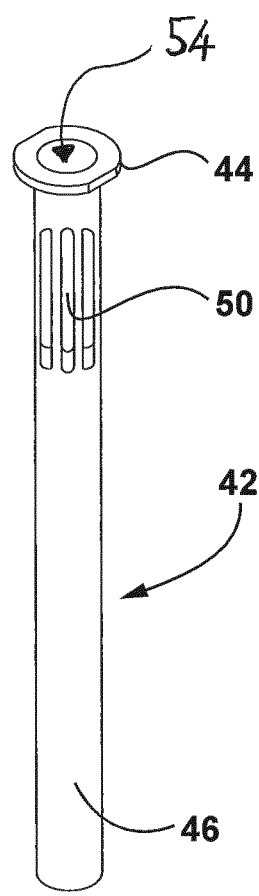
FIG. 6 is a perspective view of a catalyst filler sleeve.

Shown in FIGS. 5 and 6 is an advantageous filler sleeve 42 that is provided at its upper portion, shortly below the flange with a number of sieve openings 50. These are best seen in FIG. 6. The sieve openings are sized to block the passage of catalyst particles but to allow dust and fines to easily pass therethrough. By application of a vacuum to volume 38 via vacuum outlet 18 the loaded catalyst material can be subjected to a dust and fines removal immediately prior to its entry into the reaction tubes.

As seen in FIG. 5 the loading tray element 4 is elongate with catalyst loading openings 12 linearly arranged in a single row. This allows for good air flow to the vacuum outlet whereby dust and fines entering into the volume 38 can be readily removed via the vacuum outlet 18.

It will be clear to those skilled in the art that in the event that filler sleeves are not required for achieving outage in the catalyst loading process with tubular elements with sidewall sieve openings could be provided in the volume 38 forming a channel from catalyst loading opening 12 to its corresponding reaction tube opening 24. In this manner, dust and fines can be effectively removed during loading of the catalyst.

The vacuum capture of dust and fines can also be implemented in a catalyst loading tray that is not modularly formed but which is a single unit non-reducible element. In such a case the catalyst loading template will typically be a large array and in order to obtain a sufficient suction across the whole array the volume between the catalyst loading template and tubesheet may be divided into separate chambers by walls or the like, and each chamber is provided with a vacuum outlet. In this way each chamber is subjected to a sufficient vacuum.

The captured dust and fines is preferably collected and recycled to form fresh catalyst since it typically contains valuable catalytic metals.

It is also considered to be advantageous to include a dust sensor probe in the vacuum outlet stream. Such a probe can measure the concentration of dust removed by the vacuum and provide information indicating the levels of dust content in a batch of catalyst and the total quantity of dust recovered.

Returning to FIG. 4, the catalyst loading element 4 is provided with a vibrator 32 in vibrational contact with the catalyst loading template 14. The vibrator 32 causes the catalyst loading template 14 to vibrate so that particulate catalyst present on the catalyst loading template 14 is agitated and falls into the catalyst loading opening 12.

As can be seen in FIGS. 2A and 2B each of the catalyst loading elements is provided with such a vibrator 32. Upon construction of a larger catalyst loading tray 2 from a plurality of elements 4, the vibrators 32 on each element make it possible to effect vibration across the extended catalyst loading template 14. This advantageously aids in avoiding the need for manual or automated sweeping of catalyst particles into the catalyst loading openings 12.

Referring to FIG. 5, the catalyst loading template 14 is raised up on resilient supports 34, preferably constructed from rubber or a similar material, which act to isolate the template rest of the element 4, and the catalytic reactor, from the effects of the vibrator 32.

In an exemplary method of loading the multi-tube catalytic reactor 10 with particulate (granular) catalytic material, the catalytic material is charged to each of the reactor tubes 9 using the illustrated loading tray 2. The loading tray elements 4 are passed in unjoined form into the work space above the tubesheet 8 via a manhole or other opening. A first one of the loading elements 4 is positioned atop the tubesheet 8 with its loading holes 12 aligned with tube sheet openings 24. A further loading tray element 4 is then slid into engagement with the already laid loading tray 4 by use of the T-slot mechanism 28. This laying of further loading tray elements 4 is continued in order to make up an extended array of loading holes 12 in an extended planar template 14. Different lengths and forms of loading tray elements 4 are added into the array to obtain a desired coverage form and size matching the tubesheet and reactor, e.g. to match the outer curve and to build around cooling tubes.

Peripheral sidewall elements 26 are slotted into the outer T-slots 28 of the built array to form a closed off loading tray for the catalyst pellets when they are poured on.

Filler sleeves 40, 42 are inserted into the loading openings 12 whereby their upper flanges 44 come to rest within the template 14 and the loading openings are restricted in size to the loading orifice 54 of the filler sleeve 40, 42. The filler 40, 42 sleeves can be added prior to, during or after the assembly of the extended template array. Usually a filler sleeve, 40, 42 will be inserted into every one of the loading openings 12, however, on occasion it may be that catalyst is not to be filled into one or more of the openings, in which case a plug can be inserted to block the selected loading opening(s) 12.

A vacuum line is attached to each of the vacuum outlets 18 for application of dust removing suction to each of the volumes 38 between the loading tray templates 14 and the tubesheet 8.

Catalyst material is poured onto the assembled loading tray 2 while at the same time the vibrators 32 cause vibration of the templates 14. The catalyst particles are agitated or jostled and spill into the loading orifices 54, passing through the filler sleeves 40, 42 and into the reaction tubes. As the catalyst material passes through the upper part of the filler sleeves 40, 42 the suction applied via vacuum outlet 18 removes dust and fragments through the sieve openings 50.

The filler sleeves 40, 42, are filled to their upper level and then excess catalyst material is removed from the loading tray 2. This can conveniently be done by removing at least a part of the peripheral sidewall and sweeping the excess catalyst over the open edge of the loading tray into a receptacle.

The loading tray elements 4 are then lifted up from the tubesheet 8 raising the filler sleeves 40, 42 at the same time. The catalyst in the filler sleeves 40, 42 falls into the reactor tubes filling the tubes to the desired level with an outage. Vibration can be continued during and after lifting to ensure catalyst falls out of the filler sleeves.

The loading tray elements 4 can be lifted one at a time or in groups. Since manual lifting will often be implemented, the loading tray elements are preferably lifted one by one.

It is possible to cover a whole tubesheet 8 with an assembled loading tray 2. However, for efficient filling practices, it is often better to assemble a loading tray 2 atop only a section of the tubesheet 2 since this allows other sections of the tubesheet to be handled by another worker resulting in a speedier filling.

Further modifications in addition to those described above may be made to the structures and techniques described herein without departing from the spirit and scope of the invention. Accordingly, although specific embodiments have been described, these are examples only and are not limiting upon the scope of the invention.

What claimed is:

1. A loading tray for loading particulate material into a catalytic reactor comprising an upper tubesheet and an array of reaction tubes extending downward from the tubesheet; wherein the loading tray comprises:
    a loading template comprising a plurality of loading openings;
    one or more supports for spacing the loading template above the tubesheet to form a volume between the loading template and the upper tubesheet; and
    a vacuum outlet for application of suction to the volume between the loading template and the upper tubesheet.

2. The catalyst loading tray according to claim 1 which, when placed above the tubesheet for catalyst loading use, substantially closes the volume between the loading template and the upper tubesheet for airflow, except for the catalyst loading openings, reactor tube openings in the tubesheet, and the vacuum outlet.

3. The catalyst loading tray according to claim 1, wherein the catalyst loading template is elongate.

4. The catalyst loading tray according to claim 1, wherein the catalyst loading openings are disposed in a single row.

5. The catalyst loading tray according to claim 1, wherein the catalyst loading template comprises from 2 to 40 catalyst loading openings.

6. The catalyst loading tray according to claim 1, wherein at least one of the catalyst loading openings is provided with a filler sleeve, the filler sleeve comprising:
    an upper portion having a catalyst loading orifice and an engagement member;
    a tubular sleeve extending downwardly from said upper portion so that the catalyst loading orifice leads to an interior of the tubular sleeve; wherein
    the tubular sleeve is provided with side sieve openings sized to prevent passage of particulate catalyst but to allow passage of dust.

7. The catalyst loading tray according to claim 6, wherein the sieve openings are disposed such that when the catalyst loading tray is placed for catalyst loading use above the tubesheet, the sieve openings are at least partially located within the volume between the loading template and the upper tubesheet.

8. The catalyst loading tray according to claim 6, wherein the sieve openings are sized to prevent passage of a particle having a dimension at least about 0.2 of an upper, inner diameter of the filler sleeve.

9. The catalyst loading tray according to claim 6, wherein the filler sleeve is removable from the catalyst loading opening.

10. The catalyst loading tray according to claim 6, wherein the engagement portion of the filler sleeve is an upper flange and the catalyst loading opening is provided with a shoulder for engaging said upper flange.

11. The catalyst loading tray according to claim 1, wherein a vibrator is provided for vibrating the catalyst loading template.

12. The catalyst loading tray according to claim 1, wherein an upstanding wall is provided along at least are part of the periphery of the array of catalyst loading openings.

13. The catalyst loading tray according to claim 1, wherein the one or more supports is resilient to damp vibration.

14. A method of loading particulate catalyst into a catalytic reactor comprising an upper tubesheet and an array of reaction tubes extending downward from the tubesheet, comprising the steps of:
 a) disposing a catalyst loading tray comprising:
  a loading template comprising a plurality of loading openings;
  one or more supports for spacing the loading template above the tubesheet to form a volume between the loading template and the upper tubesheet; and a vacuum outlet for application of suction to the volume between the loading template and the upper tubesheet, above the reaction tubes of the catalytic reactor so that the catalyst loading openings align with openings of the reaction tubes;
 b) supplying the particulate catalyst material to the array of the catalyst loading openings such that the particulate catalyst material passes through the catalyst loading openings and the reactor tube openings;
 c) applying a vacuum via the vacuum outlet for at least part of the duration of step b; and
 d) removing the catalyst loading tray from the catalytic reactor.

15. The method of loading particulate catalyst into a catalytic reactor according to claim 14, including vibrating the catalyst loading template during at least part of step b.

16. The method of loading particulate catalyst according to claim 14, wherein a vacuum is applied via the vacuum outlet for the substantial duration of step b.

17. The method of loading particulate catalyst according to claim 14, including vibrating the catalyst loading template during at least part of step b, and during at least part of step d.

* * * * *